G. W. MILLER.
SAW SET MACHINE AND THE LIKE.
APPLICATION FILED FEB. 17, 1915.

1,192,921.

Patented Aug. 1, 1916.
3 SHEETS—SHEET 1.

INVENTOR
George W. Miller by W. C. Arthur Budd
ATTORNEY

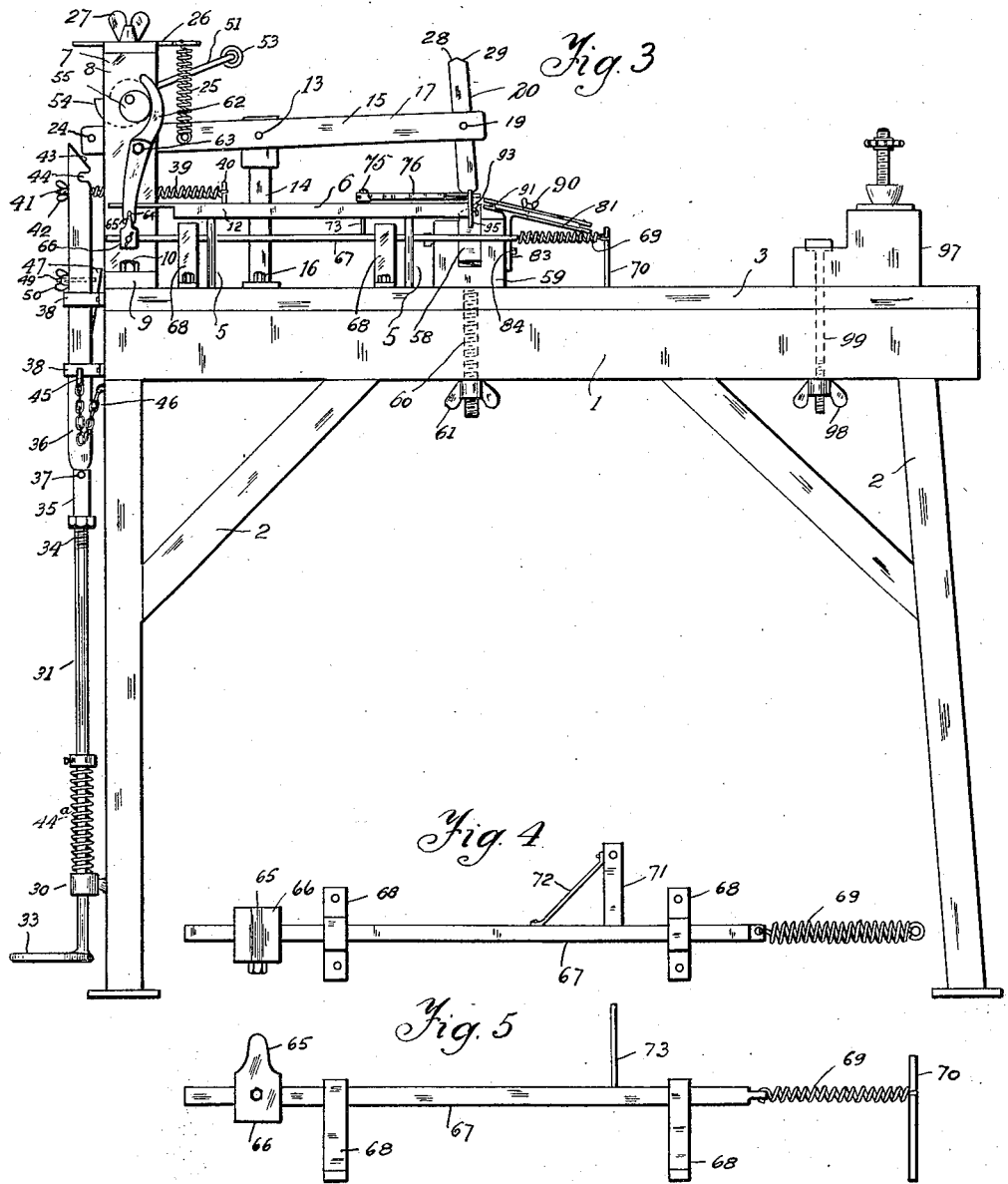

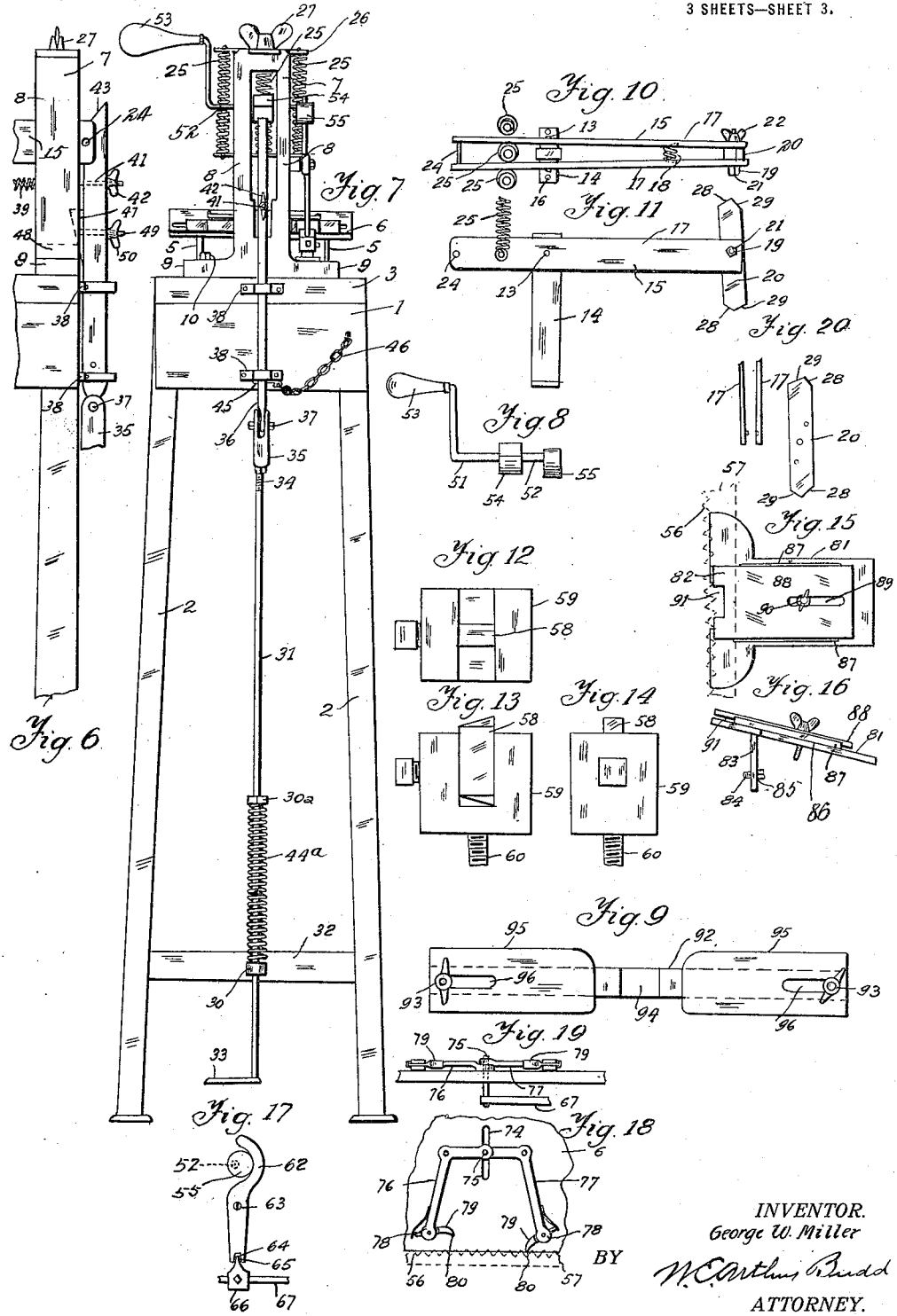

UNITED STATES PATENT OFFICE.

GEORGE W. MILLER, OF PITTSBURGH, PENNSYLVANIA.

SAW-SET MACHINE AND THE LIKE.

1,192,921. Specification of Letters Patent. Patented Aug. 1, 1916.

Application filed February 17, 1915. Serial No. 8,859.

*To all whom it may concern:*

Be it known that I, GEORGE W. MILLER, a citizen of the United States, residing at Pittsburgh, in the county of Allegheny and the State of Pennsylvania, have invented certain new and useful Improvements in Saw-Set Machines and the like, of which the following is a specification.

This invention relates to saw setting devices and more particularly to a device for setting the teeth of band, circular and hand saws wherein the teeth are struck to properly set the same in staggered relation one with the other.

A further object of my invention resides in the provision of a device for automatically tensioning the blow or strike applied to the saw body proper, so that an even force is exerted whereby the teeth are evenly staggered.

A further object of my invention is to provide a device which is operated by hand, foot or power.

In former devices the primary object is encountered in an inaccurate strike of the hammer resulting in an unproper adjustment of the saw teeth whereas in my improved device the strike is regulated, so that when the saw is fed to the hammer there is an even feed of the saw, the saw being automatically fed to the hammer upon the lifting of the latter, prior to the striking of the teeth.

A further object of my invention is to provide a device which is adapted to set saws of several types, obviating the use of separate machines for different types and which is simple, economical of construction and which easily operates.

Figure 2:
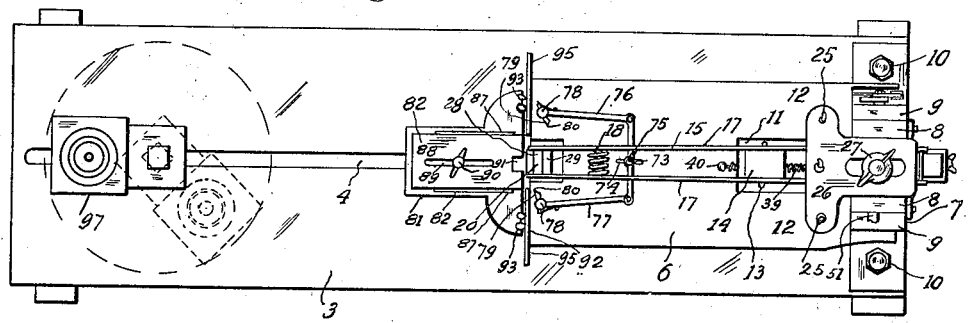
Figure 1:
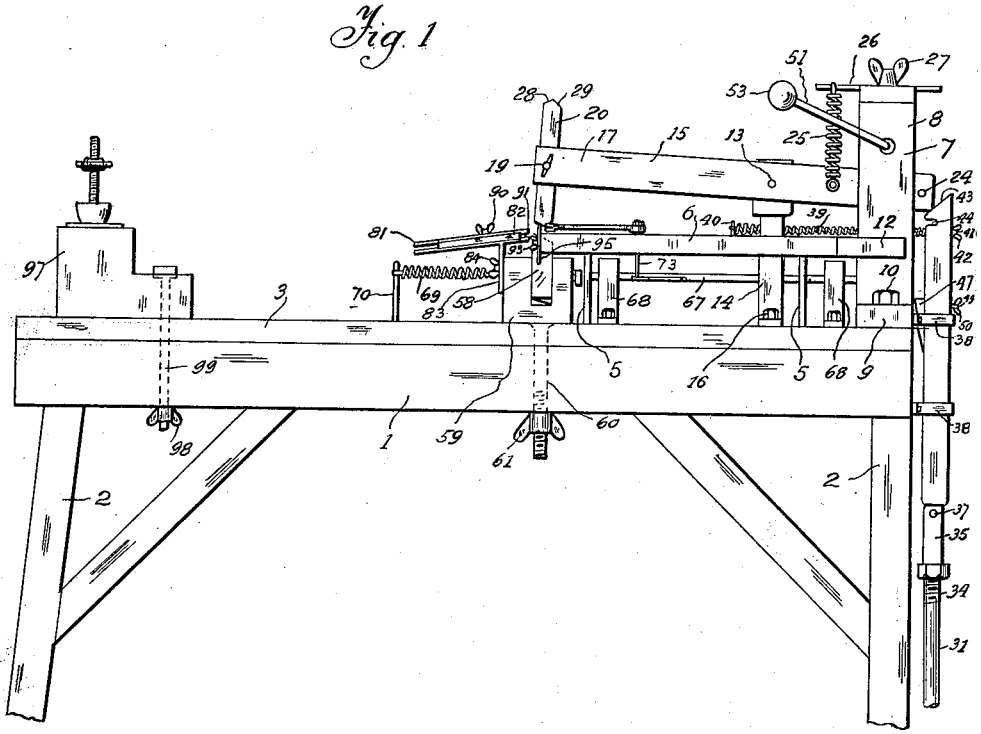

In the drawing forming a part of this specification Figure 1, illustrates a side elevation of my improved saw setting device mounted on a suitable stand, bench or pedestal. Fig. 2, is a plan view of same. Fig. 3, is a side elevation of my improved saw setting device, showing the reversed side of same. Fig. 4, is a top plan view of the feed bar. Fig. 5, is a side elevation of same, Fig. 6, is a fragmental side elevation of the foot operating bar. Fig. 7, is an end elevation of the saw setting machine showing the hand and foot operating means. Fig. 8, is an elevation of the hand crank. Fig. 9, is a plan view of the band saw adjusting means. Fig. 10, is a plan view of the hammer bars, Fig. 11, is a side elevation of same. Fig. 12, is a top plan view of the die housing and die, Fig. 13, is a side elevation of same, Fig. 14, is an end elevation of same. Fig. 15, is a plan view of the band saw guiding device, Fig. 16, is a side elevation of same. Fig. 17, is a side elevation of the cam hand operating means. Fig. 18, is a plan view of the band saw feeding mechanism. Fig. 19, is a horizontal section of the bed, showing the feeding means in elevation. Fig. 20, shows an elevation of the hammer and retaining pins therefor.

My improved saw setting device is adapted for band, circular and hand saws, and in this specification the operation is set forth, which relates more particularly to the setting of the teeth of band and circular saws, though minor changes can be made whereby hand saws may be set and nothing in this specification will constitute a waiver to the use of the machine for setting the last type of saws.

In the drawings the numeral 1, indicates the bench or stand, which may be supported on legs 2, or may be supported on a pedestal. The bench is provided at its top portion with a bed 3, which is slotted at 4, through which extends several adjustable elements which will hereinafter be more fully described. Secured to the bed 3, by bolts or rods 5, is the saw set frame 6, which is spaced from said bed extending in horizontal parallelism therewith. Arranged at one end of the bench bed 3, is the standard 7, formed with spaced vertical uprights 8, and connected at the top and the base. The outwardly flaring base portion 9, is adapted for the reception of bolts 10, by which the standard is secured to the bench bed. The saw set frame 6, at one end is provided with a slot 11, forming arms 12, and the upright portion 8, of the standard 7, is positioned in the slot 11. The arms 12, extend at each side of the standard 7, and the saw set frame 6.

Pivotally mounted as at 13, to the post 14, is the hammer arm 15, and the said post extends through slot 11 of the saw set frame and is suitably anchored by means of bolts 16, to the bench bed. The hammer arm 15, comprises the bars 17, arranged in parallel alinement, the said bars being tensioned together by the helical spring 18.

Pivotally mounted in one end of the hammer arm 15, by means of the bolt 19, is the hammer 20, and the bolt 19 is provided with a head 21, and a screw threaded shank adapted for the reception of the wing nut 22, which when tightened, holds the said hammer in adjusted position between the bars 17. The bars 17 are tensioned together by helical springs 18, arranged intermediate the hammer end thereof. The opposite ends of the bars 17 are connected together by a pin 24, and intermediate said bolt and pivot 13, are a series of helical springs 25, secured to the bars at one end, and at the opposite end to cap plate 26, the latter being detachably mounted on the top of the upright portion 8, of the standard 7, serving to tension the hammer arm at one end. A wing nut 27 mounted on the top of the standard, holds the cap plate 26 in position and regulates the tension of the springs 25. The hammer 20, at its opposite ends is cut away to form angularly disposed striking faces 28 and 29, of different dimensions, namely, each hammer end will have a large and small face, the position of the faces being reversed upon the reversal of the hammer.

Slidably mounted in the strap 30, on one end of the stand or bench, is the foot operating base rod 31, the strap 30, being suitably secured to the bench cross bar 32, and the portion of the rod 31 extending below the cross bar 32, carries a foot pedal 33. The upper end of rod 31 is screw threaded at 34, and a link member 35, is screwed thereon, said link member having its upper end slotted for the reception of the lower end of the trip rod 36, a bolt 37 serving to hold the trip rod and link together. The trip rod 36, is likewise slidably mounted in straps 38, on one end of the bench and is normally tensioned toward the standard upright 8, by means of a helical spring 39, the latter being secured at one end to the post 40, anchored in the saw set frame 6, while the rod 41, carrying the helical spring passes through the upper end of the trip rod 36, and is provided with a wing nut 42. The upper end of the trip rod 36, is beveled at 43 and provided with a groove 44, upon that edge of the rod facing the standard upright 8. Trip rod 36 is adjusted toward and from the standard upright 8, by adjusting the wing nut 42 which compresses and expands the spring 39 respectively. The beveled upper end 43, of the trip rod 36 is normally in engagement with the pin 24 connecting the hammer arm bars 17, by means of a spring 44ª, arranged on the base rod 31, between the strap 30, and the strap member 38. When the foot pedal 33 is depressed the beveled face of the trip rod 36, slidably engages the pin 24, and upon the extreme downward limit of the base rod 31, the pin 24, enters the groove 44, causing the hammer arm 15, to swing on pivot 13 against the tension of the springs 25. Upon the release of the foot pedal the base rod 31, and trip rod 36, are actuated by the compressed spring and the pin 24 is forced from groove 44, and slidably engages the beveled end of the trip rod, this operation being the reverse of the aforesaid operation.

The foot operating mechanism is held in inoperative position by means of a pin 45, which passes through the lower end of the trip rod 36, when the base rod is depressed through the medium of the foot pedal 33, and the pin engages the lower strap 38. A chain 46, is attached to pin 45, and to the bench serving to secure the pin against loss.

The wedge member or block 47, is mounted on the trip rod 36, below the groove 44 and serves, when the foot operating mechanism is inoperative, to force the upper end or portion of the trip rod outwardly from the standard, by engaging the base bar 48 of the standard, so that the upper end of the trip rod is held out of engagement with the hammer bar and the hand operating mechanism. The wedge block 47 is secured to the trip rod 36, by means of the pin 49, and wing nut 50.

The crank 51 pivotally mounted on the upper end of the standard in the spaced vertical uprights 8, is formed with a horizontal shaft 52, which at one end is bent over at right angle and the bent over portion carries the handle 53. Mounted on the horizontal shaft 52, of the crank 51, is the cam 54 and the eccentric 55, the former being located centrally of the spaced vertical uprights 8, while the latter is secured to the end of the shaft, which extends beyond the standard. The cam 54 is adapted to intermittently engage the forward end of the hammer arm 15, and when the crank is turned the hammer arm is rocked, causing the hammer 20, to strike a tooth 56 of the saw 57. Saws of the band type are fed over the die 58, which latter is detachably mounted in the housing 59, the die being disposed directly under the hammer when the same is in striking position. The die housing 59 is formed on its lower surface with a shank 60, which passes through the slot 4, of the bench bed 3, so that the said housing may be adjusted relative to the saw set frame 6. A wing nut 61, may be adjusted to securely hold the die housing in position.

The saw is fed to the die and hammer in the following manner: The eccentric 55 on the end of crank shaft 52, is normally in engagement with the rocking arm 62, which is pivotally mounted at 63, on the standard; the lower end of the rocking arm is formed with an inverted V shaped groove 64, adapted for the reception of the V shaped portion 65, of the rocking block 66. The rocking block is adjustably mounted on the rod 67, which is slidably mounted in the standards 68, suitably secured to the bench bed 3, directly under the frame 6. One end of the rod 67, has secured in any suitable manner a spring 69, and said spring is attached to a post 70 anchored in the said bench bed 3, the latter serving to tension the rod 67 toward the post 70.

A cross bar 71, is mounted on rod 67, approximately central thereof, and said cross bar is reinforced by the angle member 72. Adjacent the end of the cross bar 71, is mounted a pin 73, which projects upwardly at right angles to the cross bar 71 and extends through the slot 74 of the frame 6.

Bell crank levers are pivotally mounted at 75 on the frame 6 at approximately the central part thereof and have arms 76 and 77, respectively. Arms 76, extend outwardly at a slight angle from arm 77, and to a point immediate the die and saw. The outer ends of the arms 76, are enlarged at 78, and pawl members 79, are pivotally mounted in the enlarged ends 78, having spear points 80, adapted to engage the teeth of the saw and being capable of movement inwardly toward each other. The inner ends of arms 76 and 77, overlap and are provided with registering apertures, through which extend the pin 73, on the cross bar 71, of the rod 67.

The saw is guided over the bed by means of the gage member 81, which is provided with an inclined top portion 82 and a vertical flange 83. The flange 83 is apertured for the reception of the screw 84, which seats in an aperture 85, of the die housing, for holding the gage member on said die housing. Adjustably mounted on the gage member 81, is the plate 86, provided with flanges 87, and the plate 88, is slidably mounted on the plate 86 between the flanges 87. The plates 86 and 88, are slotted at 89, and a wing bolt 90 is provided with a shank which passes through the slots 89, whereby the plates are held in adjustable position. The lower plate 86, is adjusted to guide saws of different widths, while the upper plate 88 projects forwardly over the saw, and is formed with a recess 91, at its central part, which is located diametrically over the die 58, and the hammer 20 registers with said recess at the striking blow.

When band saws are set, the gage member 81, is removed and the adjustable band saw guide 92, illustrated in Fig. 9, is secured to the saw set frame edge by the thumb screws 93. The gage member 92 central of its length is formed with a slot 94, and slidably mounted on the outer face of the gage member, are the plates 95, having slots 96, through which the screws 93 pass, whereby the said plates are adjusted toward and away from the slot 94. The gage member 92, is used to center each individual saw tooth, the slot 94 registering with the hammer. The gage members 95 are adjustable away from, and on an angle to the gage member, and when not used for this particular type of saw, are swung downwardly out of the way.

The operation of my improved device for setting the teeth of circular saws is as follows: the base and trip rods 31, and 36, are actuated by the foot pedal 33, and the beveled upper end 43, of the trip rod engages the pin 24, in the outer end of the hammer arm 15, causing the latter to rock on the pivot 13. Upon the reverse movement the pin 24 seats in the groove 44 of the trip rod, causing the hammer arm to be rocked and the springs 25 to be tensioned. When the pedal is at its lowest point the pin is released from the groove and the hammer arm is rocked by the release of the tension springs 25. The hammer 20, strikes the upper face of the saw tooth which is positioned on the die 58, the beveled face of the hammer, and the face of the die having the same inclination.

The saw is revolubly mounted on the movable standard 97 and may be adjusted to and from the hammer and die by regulating the thumb screw 98, on the bolt 99, which latter is secured to the movable standard 97, and which is adjustable in the bed slot 4, to and from the saw set frame 6.

When band saws are to be set, the handle is turned to operate the crank shaft 51, and the cam 54, rocks the hammer arm causing the hammer to strike the saw tooth on the die, the eccentric 55, operates the rocking arm 62, and the rod 67, the bell crank levers being actuated by the rod 67, and causing the pawl members to successively engage the saw tooth, whereby the saw is moved through the gage block and over the die, but it is to be understood that changes, variations and modifications can be resorted to, which come within the scope of the claims hereunto appended.

What I claim and desire to secure by Letters Patent is:

1. A saw set machine comprising a spring controlled pivoted hammer arm, a shaft, a saw-feed mechanism including a rock arm, a cam carried by the shaft for operating the hammer arm when the shaft is actuating said hammer arm, an eccentric secured to the shaft and simultaneously rocking said arm to operate the saw feed mechanism when the shaft is actuated, and a hammer connected to the hammer arm.

2. A saw set machine comprising a pair of uprights, a support therefor, a hammer arm, supporting means for the hammer arm having the latter pivoted thereto, a hammer connected to the hammer arm, adjustable resilient elements connected with the uprights and hammer arm, and a manually operated shaft journaled in said uprights and provided with a cam associated with said elements to cause the actuation of the hammer arm when the shaft is operated.

3. A saw set machine comprising a hammer element, operating means therefor, said means including an eccentric, a saw feed mechanism having a rocking block, and a pivoted rock arm engaging said block for operating said mechanism and actuated by said eccentric to shift said block.

4. A saw set machine comprising a hammer element, operating means therefor, said means including an eccentric, a saw feed mechanism having a rocking block, and a pivoted rock arm engaging said block for operating said mechanism and actuated by said eccentric to shift said block, said rocking arm having an inverted V-shaped slot in its lower end, and said block provided with a V-shaped portion engaging in said slot.

5. A saw set machine comprising a saw feed mechanism including saw shifting elements, a pin engaging therein for operating said elements when the pin is actuated, a spring controlled combined supporting and actuating means for the pin, a block carried by said means and having a V-shaped portion, a rocking arm overlapping said V-shaped portion and adapted to shift the block to operate said means when said arm is rocked, and means for rocking the arm.

6. A saw set machine comprising the combination with a hammer, an operating hammer arm therefor, saw feed elements, of actuating means for said elements including a block and a rocking arm overlapping the block, and a shaft carrying a cam and an eccentric engaging respectively with said hammer arm and rocking arm for operating them to simultaneously actuate the feeding elements with the hammer.

7. A saw set machine comprising a spring controlled hammer arm, a vertically movable foot operated spring controlled base rod, a spring controlled trip rod pivotally connected to the base rod, a pin supported by the hammer arm, and said trip rod having means capable of engaging with said pin to cause the actuation of the hammer arm.

8. A saw set machine comprising a spring controlled hammer arm, a vertically movable foot operated spring controlled base rod, a spring controlled trip rod pivotally connected to the base rod, a pin supported by the hammer arm, and said trip rod having means capable of engaging with said pin to cause the actuation of the hammer arm, and means for locking said trip rod from movement.

9. A saw set machine comprising a spring controlled hammer arm, a vertically movable foot operated spring controlled base rod, a spring controlled trip rod pivotally connected to the base rod, a pin supported by the hammer arm, and said trip rod having means capable of engaging with said pin to cause the actuation of the hammer arm, and means for locking said trip rod from movement, and means for maintaining the trip rod clear of the hammer arm when the said rod is locked from movement.

In testimony whereof I affix my signature in the presence of two witnesses.

GEORGE W. MILLER.

Witnesses:
T. O. S. MADALINS,
JENNIE JONES.

Copies of this patent may be obtained for five cents each, by addressing the "Commissioner of Patents, Washington, D. C."